United States Patent [19]

Nix, born Saxler

[11] 4,400,665
[45] Aug. 23, 1983

[54] DEVICE FOR AUTOMATICALLY MEASURING THICKNESS OF COATINGS ON A SUBSTRATE BY COMPARISON WITH AN UNCOATED SUBSTRATE

[75] Inventor: Maria Nix, born Saxler, Cologne, Fed. Rep. of Germany

[73] Assignee: Norbert Nix, Fed. Rep. of Germany

[21] Appl. No.: 105,223

[22] Filed: Dec. 19, 1979

[30] Foreign Application Priority Data

Dec. 23, 1978 [DE] Fed. Rep. of Germany ....... 2855912

[51] Int. Cl.³ ........................ G01B 7/10; G01R 33/12
[52] U.S. Cl. ................................................. 324/230
[58] Field of Search ................ 324/229, 230, 231, 175

[56] References Cited

U.S. PATENT DOCUMENTS 2,927,455  3/1960  Outterson ............................ 324/231
3,441,840  4/1969  Randle ................................ 324/230
3,662,576  5/1972  Girlatschek ......................... 324/229
3,746,988  7/1973  Ford et al. .......................... 324/175

Primary Examiner—Gerard R. Strecker
Assistant Examiner—Walter E. Snow
Attorney, Agent, or Firm—Armstrong, Nikaido, Marmelstein & Kubovcik

[57] ABSTRACT

Instrument for measuring thickness of coatings on substrate based on space-dependent, electromagnetic interaction between a measuring probe resting against the coating and the substrate comprising a compensating probe, a comparison body with properties similar to that of the substrate, a mechanism for adjusting the spacing of the compensating probe from the comparison body, until the same electromagnetic interaction is obtained as for the measuring probe and the substrate and a device for displaying the spacing between the compensating probe and comparison body.

11 Claims, 7 Drawing Figures

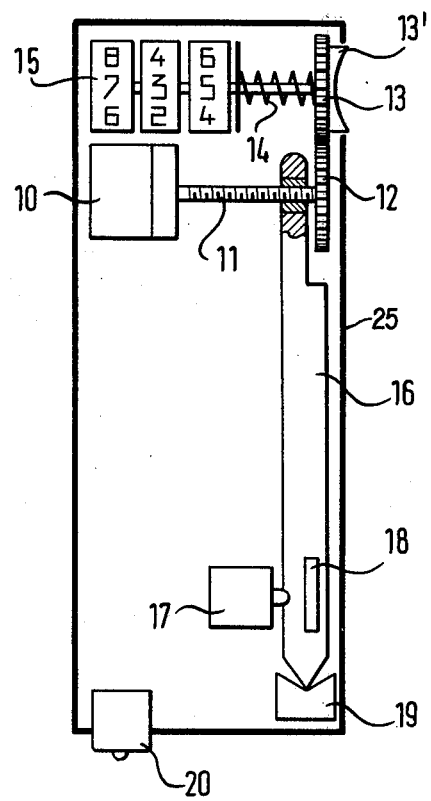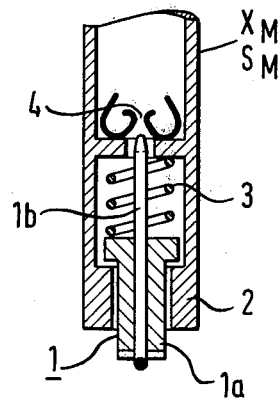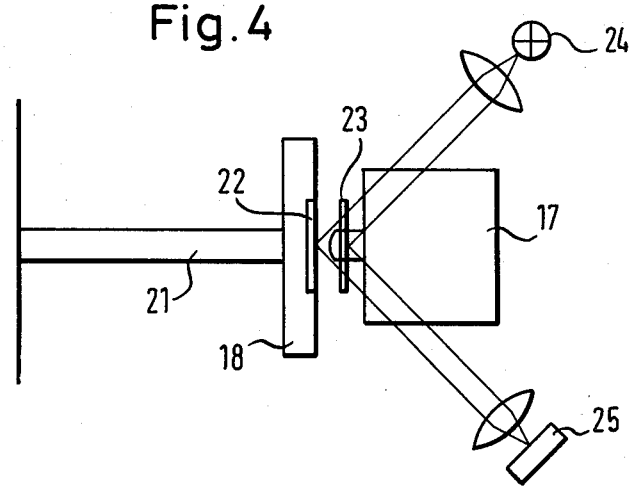

DEVICE FOR AUTOMATICALLY MEASURING THICKNESS OF COATINGS ON A SUBSTRATE BY COMPARISON WITH AN UNCOATED SUBSTRATE

BACKGROUND OF THE INVENTION

The invention relates to an instrument for measuring the thickness of coatings on a substrate on the basis of the electromagnetic interaction between a measuring probe resting on the coating and the substrate as a function of the spacing between probe and substrate.

Such conventional instruments are used in tow designs: namely, one for measuring the thickness of non-magnetic coatings, such as galvanized layers, paints, etc. on a magnetic substrate, in particular, steel and nickel, and another for measuring the thickness of insulating coatings on electrically conducting substrates.

When measuring the thickness of non-magnetic coatings on a magnetic substrate, the magnetic flux in the measuring probe varies as a function of the spacing between it and the magnetic substrate, hence as a function of the layer thickness. This variation in magnetic flux is detected, for instance, from the frequency of a magnetic switch circuit and converted into a signal which is displayed.

When measuring the thickness of non-conducting coatings on a conducting substrate, eddy currents are generated in the conducting substrate by a high-frequency AC powered measuring probe and are reflected into said probe. This feedback depends on the thickness of the layer, so that it can be converted into a corresponding electrical signal which again is displayed.

However, these known instruments suffer from various drawbacks. Thus, the dependency of the measured signal on layer thickness is approximately, but not precisely, a hyperbola. Accordingly, there will be a very pronounced change in the measured signal for extremely thin layers whereas, for thicker ones, the variation in the measured signal will only be minute. To compensate this unfavorable functional behavior in display, the initial measuring range frequently is expanded by bias-magnetization, insertion of shims of various materials or similar steps. However, the instrument complexity is substantially increased thereby. Furthermore, the measured signal cannot be digitized in simple manner because, as already mentioned, the measured function deviates from the hyperbolic shape. Therefore, special steps must be taken to correlate the output signal with a corresponding digital value.

Because of the high cost required to that end, digitally displaying instruments so far have not been marketed.

The known instruments suffer from a further problem, namely that they are extremely sensitive circuits which measure inaccurately, expecially if there are temperature fluctuations. These factors to-date could be remedied only at great cost. Finally, these instruments are also very sensitive to changes in the battery supply potential, requiring additional steps and, for instance, a display to indicate the end of battery life.

OBJECTS AND SUMMARY OF THE INVENTION

It is, therefore, the object of the invention to create an instrument for measuring the thickness of coatings on a substrate of the cited species, which shall be free of the above listed drawbacks.

In particular, an instrument is presented which is of very simple design and allows a very accurate measurement and even permits digital display.

This problem is solved by the invention by a compensating probe of which the spacing to a comparison body with electromagnetic properties similar to those of the substrate can be adjusted until the same electromagnetic interaction is obtained as for the measuring probe, and by a display means for the spacing between the compensating probe and the comparison body.

The advantages obtained by the invention in particular rest on the fact that an absolute measurement of an electrical signal no longer is required, rather that a comparison measurement is carried out. This comparison balances any temperature fluctuations or changes in supply potential and furthermore adjusts for the above-mentioned nearly hyperbolic function, whereby a very accurate signal is obtained even in the presence of changes in operational conditions. This signal also can be digitized in a simple manner, as only a fixed corresponding correlation is required between a digital display and the previously measured spacing between compensating probe and comparison body.

Appropriately, an automatic control circuit is used to adjust the spacing between compensating probe and comparison body. In this manner, one obtains simultaneously a very rapid and very accurate measurement of thickness.

Various means are available to ascertain the spacing between compensating probe and comparison body and to convert it into a display. For instance, the comparison body may be displaced by a spindle, whereby the spindle position is a direct measure of the spacing between compensating probe and comparison body and, hence, of the layer thickness. The spindle position can be displayed using a counter.

Alternatively, it is also possible to ascertain the spindle position in electro-optical manner and electronically, that is, with luminous diodes or with liquid crystal means.

As regards layer thicknesses in the range of a few microns, mechanical measurements of the spacings are complex and sometimes impossible. In such cases, the distances may be measured optically by the interference method of monochromatic light beams.

The measuring probe is appropriately so designed that the actual measuring part, upon resting on the coating, is partially inserted into a sleeve, whereby a switch is closed and hence the measuring circuit will be turned on when the probe contacts the coated substrate. This ensures that there will be power consumption only during the actual measurement and the measuring circuit will be turned off again after the end of measurement, i.e., the lifting of the probe.

Simultaneously, the measured value will be stored thereby in the counter until the next measurement is carried out, without a requirement for additional parts.

When measuring the thickness of non-magnetic coatings on ferromagnetic substrates, the magnetic flux through the test body sharply increases as the layer thickness decreases, whereby the substrate will be strongly loaded in magnetic manner and conceivably there may be spurious measurements. Therefore, the instrument is so controlled that for this method of measurement, the substrate will always be loaded by the same magnetic flux regardless of layer thickness. In such manner, furthermore, it is possible to avoid distortion of test results when magnetically poor materials are involved.

BRIEF DESCRIPTION OF THE DRAWINGS

The invention is described in further detail below in relation to embodiments and the schematic attached drawings.

FIG. 3 is a functional diagram of a digital display using a drum counter;

FIG. 4 shows the design of an optical spacing measuring means;

FIG. 5 is a cross-section of the probe.

DETAILED DESCRIPTION OF THE PREFERRED EMBODIMENTS

Figure 1:
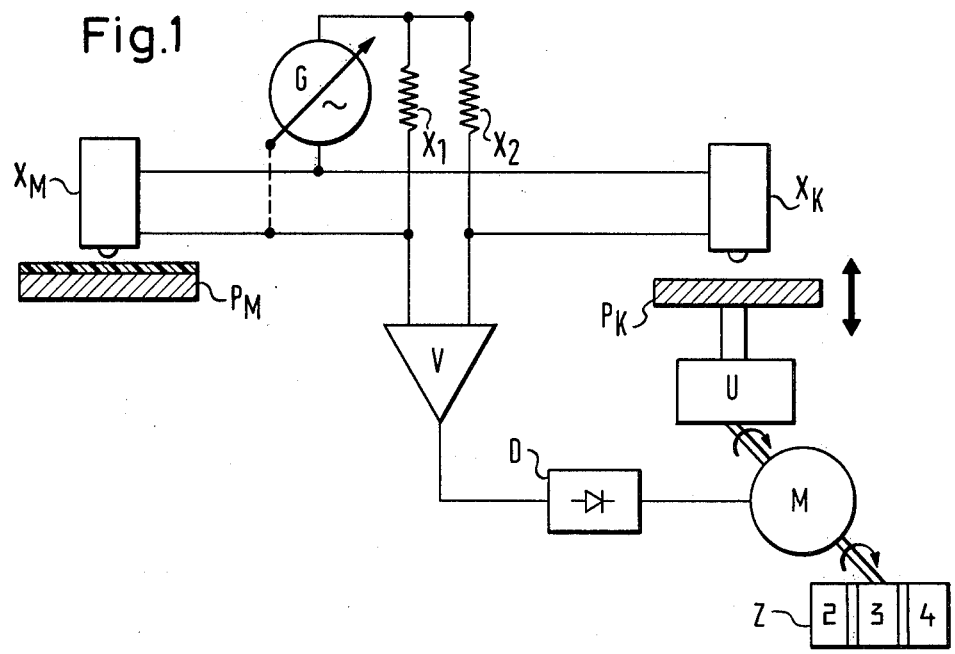
FIG. 1 is a circuit diagram of an embodiment for measuring the thickness of insulating coatings on a conducting substrate.

FIG. 1 shows an embodiment measuring the thickness of non-conducting, i.e., insulating, coatings on an electrically conducting substrate.

An AC generator G is provided feeding both the measuring probe $X_M$ and compensating probe $X_K$. The two probes $X_M$ and $X_K$, therefore, are powered by the same AC.

To carry out the thickness measurement, the measuring probe $X_M$ is placed on the insulating coating of a test body $P_M$ which is indicated schematically; this insulating coating is on an electrically conducting substrate.

When the measuring probe $X_M$ touches the test body $P_M$, the generally complex reactance of the measuring probe $X_M$ will change and a corresponding output signal is generated and fed to the input of a null-detecting circuit including an amplifier for its output, hereafter called a "null-amplifier V." The other input of the null amplifier V is fed an output signal from the compensating probe $X_K$.

Because the reactance of the measuring probe, $X_M$ is different from the reactance of the compensating probe $X_K$, the null amplifier V generates a signal corresponding to that difference in both phase and magnitude which is amplified and fed to a demodulator D. Said output signal is rectified in the demodulator and applied to a DC motor M.

The DC motor will drive its drive shaft in the direction indicated by the arrow as long as receiving a signal from demodulator D, whereby a diagrammatically shown transducer U is displaced in the direction indicated by the arrows and whereby the spacing between the conducting comparison body $P_K$ and the compensating probe $X_K$ is varied.

The spacing between the conducting comparison body $P_K$ and the compensating probe $X_K$ will be varied until the reactances of measuring probe $X_M$ and compensating probe $X_K$ are equal. In that case, the output signal from the null amplifier V is zero, the DC motor M no longer is fed a signal, and stands still.

For symmetry between the measuring probe $X_M$ and the compensating probe $X_K$, the air gap between the compensating probe $X_K$ and the conducting comparison body $P_K$ corresponds to the thickness of the non-conducting coating on the test body $P_M$.

A digital counter is coupled with corresponding reduction to the shaft of DC motor M and displays the annular speed of the shaft, and with appropriate calibration, the thickness of the non-conducting coating on the test body $P_M$ directly in millimeters.

This counter may, for instance, be designed as a drum counter Z, as explained in further detail shown below in relation to FIG. 3.

The instrument sensitivity drops as the thickness of the non-conducting coating increases. This is compensated by feeding the output signal from the measuring probe $X_M$ back to the generator G, as indicated in FIG. 1 by the dashed line. As the thickness increases, the variable-output generator G applies a higher input to the two probes $X_M$ and $X_K$, whereby the above cited effect can be compensated.

Figure 2:
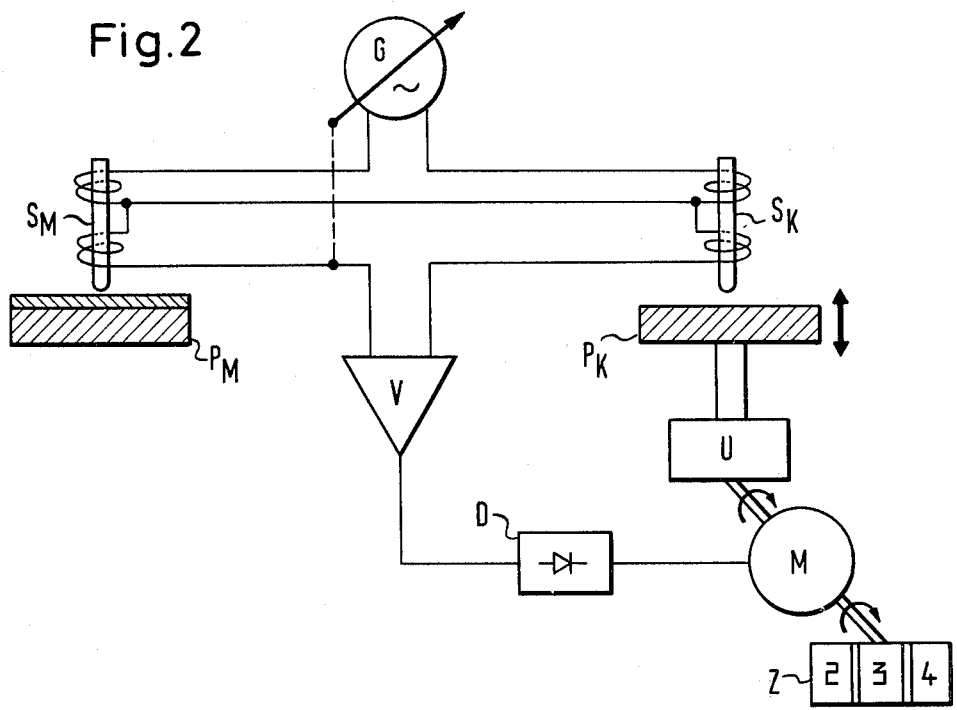
FIG. 2 is a circuit diagram of an embodiment of an instrument for measuring the thickness of non-ferromagnetic coatings on a ferromagnetic substrate.

FIG. 2 shows an implementation by means of which the thickness of non-magnetic coatings on a magnetic substrate can be measured. A generator G feeds two primary coils of a measuring probe $S_M$ and of a compensating probe $S_K$.

As the measuring probe $S_M$ nears the non-magnetic coating of test body $P_M$, a higher voltage is induced in the secondary coil of the measuring probe $S_M$ and fed to an amplifier V and compared with the corresponding signal from the secondary coil of the compensating probe $S_K$. The output signal from amplifier V is processed as in the embodiment of FIG. 1 and is used to displace the comparison body $P_K$ until the spacing between the compensating probe $S_K$ and the magnetic comparison body $P_K$ corresponds to the thickness of the non-magnetic coating on the test body $P_M$. Repeated explanation of this control mechanism will be omitted.

To increase the instrument sensitivity, there is in principle the possibility to make the primary current as high as possible. However, the resulting magnetic flux in the test body $P_M$, especially when the layer thicknesses are very minute, will be so high that the magnetic material of the substrate may saturate. Therefore, the current in the primary coil must be limited to a maximum, especially for small layer thicknesses.

On the other hand, as the layer thickness increases, the magnetic flux drops rapidly, whereby the sensitivity again decreases. It is precisely in this range that an increase in sensitivity is required, so that the current through the primary coil will be increased.

For that reason, in the embodiment of FIG. 2, the current passing through the primary coils of probes $S_M$ and $S_K$ is increased as a function of the thickness of the non-magnetic coating on the test body. $P_M$. Therefore, the output signal from the measuring probe $S_M$ is fed back to the generator as indicated by the dashed line. The output current from generator G, and hence that through the primary coils is therefore adjusted as a function of said output signal from the measuring probe. In this manner, one obtains, on one hand, higher sensitivity for greater layer thicknesses and, on the other, one avoids the spurious measurements as may occur for very thin layers due to saturating the substrate.

FIG. 3 shows the digital display means in detail. A correspondingly reduced electromotor 10 is provided which corresponds to the DC motor M in the embodiments of FIGS. 1 and 2.

Electric motor 10 comprises an extended shaft designed as a threaded spindle 11. At the end of threaded spindle 11 there is a gear 12 which, through a further gear 13, drives a drum counter 15. A lever 16 supported at 19 by its upper end engages the threaded spindle 11 by a nut. A compensating plate 18 is mounted to the lower end of layer 16.

When electric motor 10 is running and, therefore, threaded spindle 11 is rotating, the compensating plate 18 more or less approaches a compensating probe 17 until finally the above-discussed balance is achieved. The drum counter 15 rotates simultaneously, so that the read-out digits of counter 15 always display the spacing between the compensating probe 17 and the balancing plate 18. When the spacings are the same, on one hand, between the comparison body and the compensation probe and, on the other hand, between test body and measuring probe, the layer thickness can be read off at once.

The measuring probe is shown schematically at 20 in FIG. 3. The projecting tip can be placed on the coating of which the thickness is desired to be known.

A knob 13' is provided at gear 13 protruding sideways out of the instrument housing 25. A slight fingertip pressure on knob 13' will displace the gear 13 sideways, whereby the drum counter 15 will be decoupled from the gear 12; if knob 13' is simultaneously rotated, an arbitrary display value may be set without moving lever 16 along.

When releasing the knob 13', spring 14 seated on the shaft of the gear 13 displaces this gear 13 again to the right as shown in FIG. 3, whereby it is coupled with gear 12.

This adjustment of the read-out count allows, therefore, setting the null of the instrument or another known value.

Figure 7:
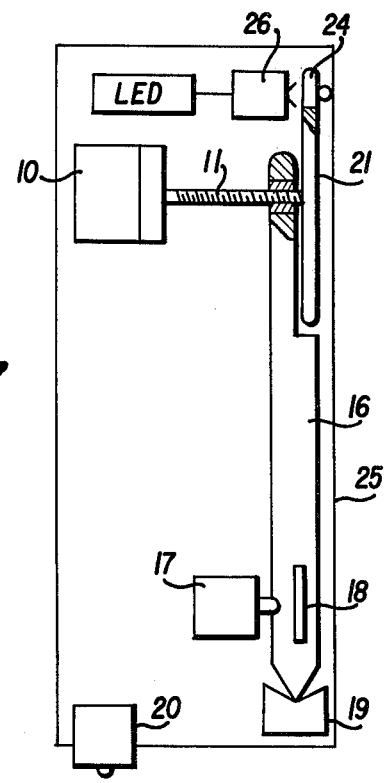
FIG. 7 shows an embodiment utilizing an LED display.

The free space between the measuring probe 20 and electric motor 10 is reserved for the electronics, which is omitted here.

Where the display is to be by means of light-emitting diodes (LED) or liquid-crystal dioded (LCD), an optical stop 24 cooperating with a small light-barrier 21 is used instead of the gear 12. When rotating said stop or aperture, pulses will be generated when breaking—or closing—the light barrier, which represent a measure of the rotation of shaft 11 of the electric motor 10. These pulses are directly fed to the display counter 26, where they represent the number of revolutions of shaft 11 and hence the thickness of the coating directly in digital form. In this embodiment, the components 13, 14 and 15 are not needed as shown in FIG. 7.

Figure 6:
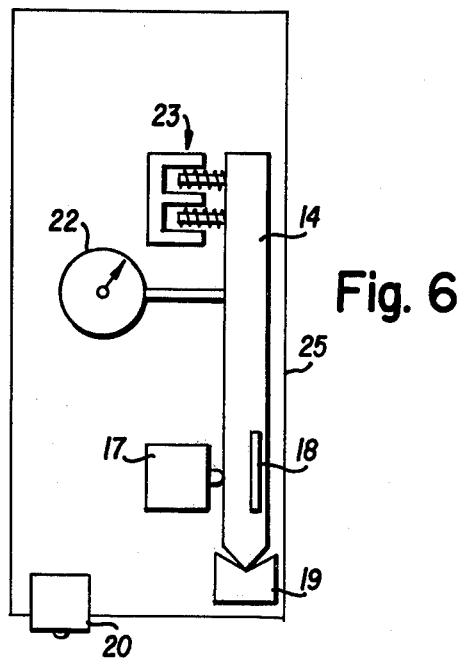
FIG. 6 shows an embodiment utilizing a moving-coil system.

The electric motor 10 with spindle 11 can also be replaced by a moving-coil system 23, where the mechanical displacement acts directly on lever 16 as shown in FIG. 6. In this case, the display appropriately will be provided by a mechanical or electrical length-indicator, for instance, a dial-gauge 22.

As regards extremely thin layers, a piezoelectric or magnetostrictive transducer may be used for the mechanical displacement of the comparison body. It is furthermore possible to make use of the thermal expansion of an electrically heated wire to displace the comparison body $P_K$ with respect to the compensating probe $X_K$ or $S_K$.

In the range of a few microns, the spacing between the comparison body $P_K$ and the compensating probe can be measured mechanically only with great difficulty. In this case, the spacing can be measured optically using the interference of monochromatic light beams. A corresponding embodiment is shown in FIG. 4.

In this embodiment, a movable part 21 is provided which is rigidly fixed to the comparison body $P_K$ and moves along with it. A plate 18 with a mirror 22 is mounted to part 21.

The compensating probe 17 also comprises a stationary mirror 23.

Collimated light from a monochromatic light source 24 is incident on both mirrors, where it is reflected and passed through a condenser to fall on a photocell 25. If plate 18 is displaced from part 21 in the manner discussed above, maxima or minima of brightness will be generated on photocell 25 in precise relation to the displacement of plate 18. The photocell 25 emits corresponding pulses which, in turn, depend on the spacing between the comparison body and the compensating probe. The pulses therefore represent a direct measure of the thickness of the coating, whereby they can be displaced upon processing.

In this embodiment, too, there may be a null shift corresponding to FIG. 3.

FIG. 5 shows an embodiment of the measuring probe. This measuring probe comprises a pin-shaped measuring part 1 with a somewhat enlarged front end 1a. A helical spring 3 is seated on the rear narrower end region 1b of measuring part 1. The measuring part 1 can be pushed somewhat into a probe sleeve 2 against the force of helical spring 3 when the front end 1a is placed on a coating and the measuring probe is pressed down.

In this motion of the measuring part 1 into the probe sleeve 2, the rear region 1b of the measuring part 1 closes a switch 4 acting as the main switch for the overall instrument. Only upon closing of this switch, will the power supply be turned on so that power will be used only as long as the measuring probe is pressed against a test body, that is, only as long as a measurement is carried out. When, upon termination of the measurement, the measuring probe is lifted off the test body, the measuring part 1 is pressed out of the probe sleeve 2, whereby the switch 4 is reopened and hence the power supply turned off. This means that simultaneously the measured value present in the counter remains constant and is stored until the next measurement.

What is claimed:

1. A portable instrument for measuring the thicknesses of coatings on substrates based on a spacing-dependent, electro-magnetic characteristic of the substrate, comprising a housing enclosing:
   a measuring probe for resting against the coating and interacting with the substrate to measure the characteristic,
   a comparison body with the same electromagnetic characteristic as the substrate,
   a compensating probe for interacting with the comparison body to measure the characteristic of the comparison body,
   means for adjusting the spacing of the compensating probe from the comparison body until the same electromagnetic interaction is obtained as between the measuring probe and the substrate, and
   means for displaying the spacing between the compensating probe and comparison body, said means for adjusting including an automatic control circuit for adjusting the spacing between the comparison body and the compensating probe, and electric drive means operated by said automatic control circuit for displacing the comparison body, said means for displaying being operatively coupled to said electric drive means.

2. An instrument according to claim 1 wherein said automatic control circuit comprises a generator for powering the measuring probe and the compensating probe connected thereto, a null detecting circuit connected to both probes including an amplifier for amplifying the output signals from both probes, and a demodulator receiving a signal from the null detecting circuit for the rectification of the output signal from the amplifier connected to operate the electric drive means.

3. An instrument according to claim 2 wherein said electric drive means comprises an electric motor.

4. An instrument according to claim 2 wherein said electric drive means comprises a piezoelectric transducer.

5. An instrument according to claim 2 wherein said electric drive means comprises a magnetorestrictive transducer.

6. An instrument according to claim 2 wherein said electric drive means comprises a movable-coil system.

7. An instrument according to claim 1 wherein said means for displaying comprises an aperture stop cooperating with a light-barrier for the purpose of generating pulses for digital display of the spacing between the comparison body and the compensating probe.

8. An instrument according to claim 3 wherein said means for displaying comprises a drum counter and a shaft of the electric motor coupled to the drum counter.

9. An instrument according to claim 8 wherein said means for displaying further comprises means for the manual adjustment of the null point of the display means.

10. An instrument according to claim 1 wherein said measuring probe comprises a measuring part which is displaceable under pressure for the purpose of turning on the power.

11. An instrument according to any of claims 2 through 10 characterized in that the output signal from generator is controlled as a function of the output signal from the measuring probe.

* * * * *